US005552222A

United States Patent [19]

Bolon et al.

[11] Patent Number: 5,552,222

[45] Date of Patent: Sep. 3, 1996

[54] ELECTRICALLY CONDUCTIVE ARTICLES COMPRISING INSULATION RESISTANT TO CORONA DISCHARGE-INDUCED DEGRADATION

[75] Inventors: Donald A. Bolon, Charlton; Patricia C. Irwin, Altamont, both of N.Y.

[73] Assignee: General Electric Company, Schenectady, N.Y.

[21] Appl. No.: 379,812

[22] Filed: Jan. 27, 1995

[51] Int. Cl.$^{6}$ .......... B32B 9/00

[52] U.S. Cl. .......... 428/379; 174/120 SR; 428/447; 428/209

[58] Field of Search .......... 428/389, 379, 428/384, 375, 209, 391, 383, 447; 174/120 SR, 120 AR; 528/206, 26

[56] References Cited

U.S. PATENT DOCUMENTS

| | | | |
|---|---|---|---|
| 3,971,884 | 7/1976 | Meeks | 174/120 SR |
| 4,324,882 | 4/1982 | Takekoshi | 528/206 |
| 4,537,804 | 8/1985 | Keane et al. . | |
| 4,693,937 | 9/1987 | Wu | 428/389 |
| 4,760,296 | 7/1988 | Johnston et al. . | |
| 4,863,992 | 9/1989 | Wengrovius et al. . | |
| 4,935,302 | 6/1990 | Hjortsberg et al. . | |
| 5,077,370 | 12/1991 | Lee | 528/26 |

FOREIGN PATENT DOCUMENTS

| | | |
|---|---|---|
| 0287814 | 10/1988 | European Pat. Off. . |

OTHER PUBLICATIONS

Concise Chemical & Tech Dictionary Page.

*Primary Examiner*—Patrick Ryan
*Assistant Examiner*—Patrick Jewik
*Attorney, Agent, or Firm*—William H. Pittman

[57] ABSTRACT

Conductors of electric current in turbine generators and the like are insulated with materials resistant to damage by corona discharge. The insulating materials include an inner layer of a thermoplastic such as a polyetherimide, and an outer layer of a polyorganosiloxane material such as a silicone polyimide or the product of curing a room temperature vulcanizable silicone composition.

16 Claims, No Drawings

ELECTRICALLY CONDUCTIVE ARTICLES COMPRISING INSULATION RESISTANT TO CORONA DISCHARGE-INDUCED DEGRADATION

BACKGROUND OF THE INVENTION

This invention relates to the insulation of metallic conductors of electricity, and more particularly to the protection of insulating coatings from damage caused by corona discharges.

Insulation on high voltage electrical conductors is frequently exposed to corona discharges. Such discharges are the result of breakdown of gases in voids in the insulation or in air adjacent to the insulation, and can cause degradation of the insulating coating.

Numerous methods have been disclosed for protecting polymeric insulating coatings against the effects of corona discharge. They generally involve suspension of inorganic fillers in the polymer. Typical fillers include organometallic compounds of such elements as silicon, tin, lead, antimony, iron and nickel and inorganic oxides such as those of zinc, ferric iron and aluminum. Reference is made, for example, to U.S. Pat. Nos. 4,537,804, 4,760,296 and 4,935,302 and European patent application 287,814.

Recently, there has been interest in employing temperature-resistant polymers such as polyimides, polyetherketones, polyethersulfones and polyphthalamides as insulators for high voltage equipment. The incorporation of fillers such as mica in such polymers to protect against the effects of corona discharges has been attempted but is not entirely successful. Among the reasons are the unavailability of low cost solvents in which such polymers may be dissolved and the filler materials dispersed, and the fact that the high filler loadings, typically above 15% by weight, which are necessary to provide the desired protection against corona discharges are difficult or impossible to attain.

Studies have also been made of the incorporation of polyorganosiloxanes, hereinafter sometimes designated "silicones", in polymers to protect against corona discharge. Such attempts have generally not been successful, principally because of the incompatibility of silicones with many thermoplastics.

SUMMARY OF THE INVENTION

The present invention provides a relatively simple, inexpensive method of protecting thermoplastic insulation, particularly comprising high temperature thermoplastics, against the effects of corona discharge. This protection is afforded by providing a two-layer insulation system in which the outer silicone layer protects the underlying thermoplastic layer against degradation.

Accordingly, the invention is an article comprising a metallic conductor of electric current having an insulating coating on its surface, said coating comprising an inner layer comprising a heat-resistant non-silicon-containing thermoplastic first polymer and an outer layer comprising a second polymer having at least about 30% by weight of polyorganosiloxane units.

DETAILED DESCRIPTION; PREFERRED EMBODIMENT

The articles of this invention include insulated high voltage conductors employed in all types of electrical equipment including alternating current motors and generating equipment, typically turbine generators and the pads thereof, and transmitting and receiving equipment for high voltage electricity. In particular, such generating equipment as stator bars and tie bars connected therewith are included. The conducting metal therein is typically copper.

The inner layer of the insulation can comprise any heat-resistant non-silicon-containing thermoplastic polymer. As previously mentioned, polymers often particularly preferred for this purpose are polyimides, polyphthalamides, polyetherketones and polyethersulfones. A particularly preferred subgenus of resins is the polyetherimides, typically the reaction products of at least one diamine such as m-phenylenediamine and p-phenylenediamine with at least one ether dianhydride such as 2,2-bis[(3,4-dicarboxyphenoxy)phenyl]propane dianhydride (hereinafter "BPADA").

It is often preferred for the outer layer to contain one of the fillers mentioned hereinabove. Preferred fillers under many conditions are alumina, silica and mica. When employed, they are usually present in amounts up to about 15% by weight based on said first polymer.

The crux of the present invention is the outer layer of the insulation, which comprises a second polymer having at least about 30% and preferably at least about 40% by weight of polyorganosiloxane, preferably polydiorganosiloxane and most preferably polydimethylsiloxane, units. In other respects, the identity of said second polymer is not critical, provided it adheres adequately to the inner layer.

For example, the second polymer may be a silicone polyimide such as the reaction product of at least one dianhydride with at least one diamine wherein at least one reagent contains silicone units. Commercially available products prepared by the reaction of BPADA with an amine mixture including at least one bis(3-aminopropyl)polydimethylsiloxane, generally in combination with at least one of p-phenylenediamine and m-phenylenediamine, are illustrative. The percentage of polyorganosiloxane units therein is defined as the proportion of $SiR_2O$ units, wherein R is an organo group and preferably a methyl group, as a percentage of the weight of the entire polymer. Preferably, however, the second polymer is the cured product of a room temperature vulcanizable (hereinafter "RTV") silicone composition. A summary of the chemistry of RTV compositions may be found in U.S. Pat. No. 4,863,992, incorporated herein by reference. They generally comprise acyloxy- or alkoxy-terminated polydimethylsiloxanes in combination with curing catalysts, usually aluminum, titanium or tin compounds. Other materials including adhesion promoters, polyalkoxysilanes, plasticizers and curing accelerators may also be present. Upon exposure to atmospheric moisture, such compositions cure to form tack-free elastomers.

While the present invention is in no way dependent on theory, it is believed that the mechanism by which the silicone coating inhibits damage caused by corona discharge is by at least partial degradation to silica at the high temperatures generated by the discharge. Said silica then functions like a filler to diffuse the electrical field of the discharge and prolong the life of the insulation.

It might be expected, therefore, that the presence of additional filler, particularly silica, in the outer layer would result in still greater improvement in resistance to corona damage. This is usually not found to be the case; the silica generated by degradation of the outer layer is usually sufficient. However, fillers are usually present in RTV compositions and the like and are not harmful; therefore their presence in the outer layer is within the scope of the invention. Suitable fillers for this purpose include reinforcing materials such as silica aerogel, fumed silica, precipitated silica, glass fibers, titanium dioxide, zirconium silicate, iron oxide, calcium carbonate, diatomaceous earth and carbon black, and extending materials such as ground quartz and polyvinyl chloride, as well as mixtures thereof. Silica and especially fumed silica is usually preferred, in the amount of about 5–25% based on said second polymer.

The inner layer may be applied to the metallic conductor by conventional methods such as heat-facilitated wrapping or solvent deposition. The thickness of said first layer is generally in the range of about 100–1,000 and especially about 125–750 microns.

The outer layer may likewise be applied conventionally, as by solvent deposition, rolling, brushing, wiping or drawing down. Its outer surface is preferably as smooth as possible to minimize etching by corona discharge action. The thickness of the outer layer is typically about 10–100 microns.

The effectiveness of the inner and outer layers provided in the articles of this invention to suppress damage by corona discharge is shown by a series of tests in which molded plaques of various thermoplastic resins were provided with silicone layers. The resins and silicones employed were as follows; all percentages are by weight and based on resin or silicone.

Resin 1—polyimide prepared from BPADA and m-phenylenediamine, commercially available from GE Plastics.

Resin 2—polyetherimide from BPADA and p-phenylenediamine, commercially available from GE Plastics.

Resin 3—polyphthalamide, commercially available from Amoco Chemicals.

Silicone A—cured acetoxy-capped polydimethylsiloxane RTV composition.

Silicone B—Silicone A plus about 20% fumed silica, commercially available from GE Silicones.

Silicone C—Silicone polyetherimide prepared by the reaction of BPADA with m-phenylenediamine (60 mole percent) and a bis(γ-aminopropyl)-terminated polydimethylsiloxane containing an average of 10 siloxane units, and comprising about 40% by weight of said siloxane units, commercially available from GE Plastics.

Coating of the plaques with Silicones A and B was achieved by wiping and drawing down, followed by curing; with Silicone C, spin-coating with a chloroform solution of the silicone polyetherimide followed by evaporation of the solvent was employed.

The coated plaques were placed between electrodes of a corona discharge apparatus operated at 60 Hz and 7.5 kV, except that in some instances a frequency of 30 kHz was employed and the results were converted to 60 Hz. For each plaque, the time to failure of the material was determined, failure constituting breakdown of the polymer with resulting short-circuiting. The results are given in the following table.

| Resin | | Silicone | | Failure |
|---|---|---|---|---|
| Identity | Thickness, μ | Identity | Thickness, μ | time, hours |
| 1 | 3175 | – | — | 80, 140, 150 |
| 1 | 3175 | B | 50 | >1600 |
| 2 | 1700 | – | — | 180 |
| 2 | 1700 | B | 50 | >4000 |
| 2 | 125 | C | 50 | 700 |
| 3 | 3175 | – | — | 145 |
| 3 | 3175 | B | 50 | >1600 |
| 3 | 3175 | B | 25 | >1600 |
| 3 | 3175 | B | 12 | >1600 |
| 3 | 3175 | A | 50 | >1600 |

It is apparent that the plaques containing the silicone outer layer are substantially superior in resistance to damage by corona discharge to the plaques not containing such a layer. It is also apparent that the RTV-coated plaques (Silicones A and B) are superior in this respect to the silicone polyetherimide-coated plaque.

Other control experiments were conducted using resins 1 and 2 filled with 10% mica or silica with an average particle size of 10 microns. The results were not substantially different from those of the controls listed in the table. It is expected that similar improvements in resistance to corona discharge damage would be shown if the outer coating according to the present invention were employed with said filled resins.

What is claimed is:

1. An article comprising a stator bar or tie bar for a turbine generator, said stator bar or tie bar having an insulating coating on its surface, said coating comprising an inner layer comprising a heat-resistant non-silicon-containing thermoplastic first polymer which is a polyimide, polyphthalamide, polyetherketone or polyethersulfone and an outer layer comprising a second polymer having at least about 30% by weight of polyorganosiloxane units.

2. An article according to claim 1 wherein the stator bar or tie bar is of copper.

3. An article according to claim 1 wherein the first polymer is a polyetherimide.

4. An article according to claim 4 wherein the polyetherimide is the reaction product of at least one of m-phenylenediamine and p-phenylenediamine with 2,2-bis[(3,4-dicarboxyphenoxy)phenyl]propane dianhydride.

5. An article according to claim 1 wherein the inner layer contains a filler.

6. An article according to claim 5 wherein the proportion of filler in said inner layer is up to about 15% by weight based on said first polymer.

7. An article according to claim 5 wherein the filler is alumina, silica or mica.

8. An article according to claim 1 wherein the second polymer is a silicone polyimide or the cured product of a room temperature vulcanizable composition.

9. An article according to claim 8 wherein the polyorganosiloxane units are polydimethylsiloxane.

10. An article according to claim 9 wherein the second polymer is the reaction product of:

the combination of (1) at least one bis(3-aminopropyl)polydimethylsiloxane and (2) at least one of p-phenylenediamine and m-phenylenediamine with 2,2-bis[(3,4-dicarboxyphenoxy)phenyl]propane dianhydride.

11. An article according to claim 9 wherein the second polymer is the cured product of a room temperature vulcanizable composition comprising acyloxy- or alkoxy-terminated polydimethylsiloxanes.

12. An article according to claim 9 wherein the outer layer contains a filler.

13. An article according to claim 12 wherein the proportion of filler in said outer layer is about 5–25% by weight based on said second polymer.

14. An article according to claim 12 wherein the filler is fumed silica.

15. An article according to claim 1 wherein the thickness of the inner layer is in the range of about 100–1000 microns.

16. An article according to claim 1 wherein the thickness of the outer layer is in the range of about 10–100 microns.

* * * * *